United States Patent [19]

Kuroiwa et al.

[11] Patent Number: 4,782,930
[45] Date of Patent: Nov. 8, 1988

[54] POWER TRANSMISSION APPARATUS

[75] Inventors: Toshiaki Kuroiwa; Masao Teraoka, both of Tochigi, Japan

[73] Assignee: Tochigifujisangyo Kabushiki Kaisha, Japan

[21] Appl. No.: 8,777

[22] Filed: Jan. 30, 1987

[30] Foreign Application Priority Data

Feb. 4, 1986 [JP] Japan .............................. 61-13979[U]
Feb. 5, 1986 [JP] Japan .............................. 61-14478[U]
Jun. 9, 1986 [JP] Japan .............................. 61-86532[U]

[51] Int. Cl.⁴ ............................................. F16D 35/00
[52] U.S. Cl. .............................. 192/58 C; 192/58 R; 192/58 B
[58] Field of Search ............... 192/58 B, 58 C, 58 A, 192/58 R

[56] References Cited

U.S. PATENT DOCUMENTS

| 923,565 | 6/1909 | Newcomb | 192/58 B |
|---|---|---|---|
| 1,192,233 | 7/1916 | Severy | 192/58 B |
| 1,881,082 | 10/1932 | Kiep | 192/58 A X |
| 2,879,872 | 3/1959 | Van Ranst | 192/58 B X |
| 3,307,665 | 3/1967 | Graae | 192/58 B |
| 3,380,565 | 4/1968 | Wilkinson | 192/58 B |
| 3,727,735 | 4/1973 | La Flame | 192/58 B |
| 4,040,271 | 8/1977 | Rolt et al. | 192/58 B X |
| 4,610,341 | 9/1986 | Hauser et al. | 192/58 B |

FOREIGN PATENT DOCUMENTS

158765 12/1975 Japan .

Primary Examiner—Rodney H. Bonck
Attorney, Agent, or Firm—Samuels, Gauthier, Stevens & Kehoe

[57] ABSTRACT

A power transmission apparatus comprises first and second rotary devices rotatable with respect to each other, a sealed chamber hermetically formed between the first and second rotary devices and filled with viscous fluid, first and second resistance devices disposed within the sealed chamber and respectively rotatable together with the first and second rotary devices to transmit torque therebetween by the shearing resistance of the viscous fluid, and a third device for controlling the pressure within the sealed chamber in accordance with the running state of an object provided with the power transmitting apparatus.

4 Claims, 6 Drawing Sheets

POWER TRANSMISSION APPARATUS

BACKGROUND OF THE INVENTION

The present invention relates to a power transmission apparatus used in a vehicle etc.

A power transmission apparatus used in a vehicle is disclosed in Japanese Laid-Open Patent No. 50-158765 for example. In such an apparatus, torque is transmitted between a plurality of rotary plates closely spaced and relatively rotated with respect to each other within a sealed chamber by means of the shearing resistance of a viscous fluid contained in the chamber and filling the spaces between the rotary plates. Such a structure is called a viscous coupling combined with a center differential device etc. for a vehicle and is used as a differential restricting device.

In the center differential device, the vehicle can run while absorbing the differential rotation generated between the front and rear wheel shafts when cornering. However, when the vehicle travels over muddy or slippery terrain, and one of the front and rear wheels begins to slip, the transmitted torque is greatly reduced and the slipping wheel rotates at a high speed, and the other wheels are stopped by the great reduction of the transmitted torque. As a result, the vehicle tends to become stuck. The differential function is restricted to improve such a situation.

In the situation mentioned above, the rotary plates connected to the front and back wheel shafts are relatively rotated by the state in which one of the wheels slips and the other wheels are stopped so that the shearing resistance of the viscous fluid is generated, thereby generating the action for restricting the relative rotation of the rotary plates. Thus, the one of the wheels is prevented from the slips and the transmitted torque is increased and the other wheels are rotated so that the vehicle can get underway.

However, in such a power transmission apparatus or the viscous coupling, the temperature within the sealed chamber is increased by the mutual rotation of the resistance plates, thereby increasing the pressure in the sealed chamber. When the temperature in the chamber has reached a predetermined temperature, as shown in the Japanese Laid-Open Patent, the transmitted torque between the resistance plates tends to rapidly increase. This is called a hump phenomenon which is important to determine the performance of the viscous coupling.

It is advantageous to increase the transmitted torque by increasing the pressure in the chamber due to the increase of the temperature wherein when the differential restricting function is greatly needed. However, it is possible that such as phenomenon occurs when it is not needed.

Further, in the conventional apparatus, it is difficult to measure the pressure within the sealed chamber since the sealed chamber is disposed within a rotary portion of the apparatus. In addition, the performance of the viscous coupling is determined when the viscous coupling is assembled, and the occurrence of the hump phenomenon depends on viscous couplings.

Furthermore, in the conventional power transmission apparatus comprising a viscous coupling or a viscous clutch, the viscous fluid such as silicon oil is filled within the apparatus at a predetermined rate after the assembly thereof. However, in such a conventional apparatus, the characteristics of the transmitted torque is determined by the filling rate of the viscous fluid at the initial stage so that it is possible to generate a phenomenon for braking the transmitted torque.

SUMMARY OF THE INVENTION

To overcome the problems mentioned above, an object of the present invention is to provide a power transmission apparatus in which the occurrence of the hump phenomenon is controlled to improve the running characteristics of a vehicle.

Another object of the present invention is to provide a power transmission apparatus in which the pressure within a sealed chamber is detected and controlled so as to reliably operate the apparatus.

Another object of the present invention is to provide a power transmission apparatus in which it is possible to transmit torque required in the running situation of a vehicle.

With the above objects in view, the present invention resides in a power transmission apparatus comprising first and second rotary means rotatable with respect to each other, a sealed chamber hermetically formed between the first and second rotary means and filled with viscous fluid, first and second resistance plate means disposed within the sealed chamber and respectively rotatable together with the first and second rotary means to transmit torque therebetween by the shearing resistance of the viscous fluid, and third means for controlling the pressure of the viscous fluid within the sealed chamber in accordance with the running state of an object provided with the power transmitting apparatus.

BRIEF DESCRIPTION OF THE DRAWINGS

The present invention will be more apparent from a description of the preferred embodiments thereof in conjunction with the accompanying drawings in which.

DETAILED DESCRIPTION OF THE PREFERRED EMBODIMENTS

A power transmission apparatus according to the preferred embodiments of the present invention will be described with reference to the drawings.

Figure 1:
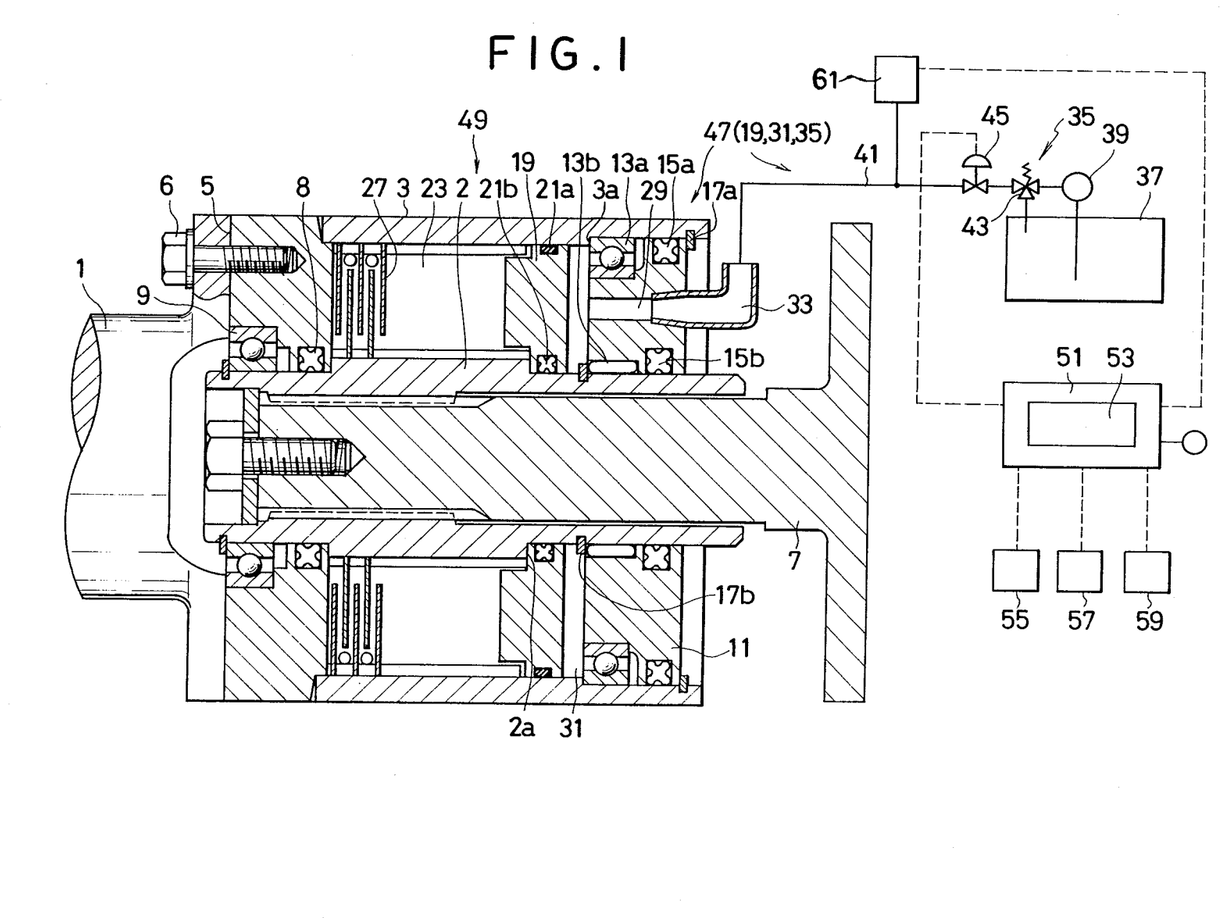
FIG. 1 is a view showing the construction of a power transmission apparatus according to one embodiment of the present invention.
Figure 2:
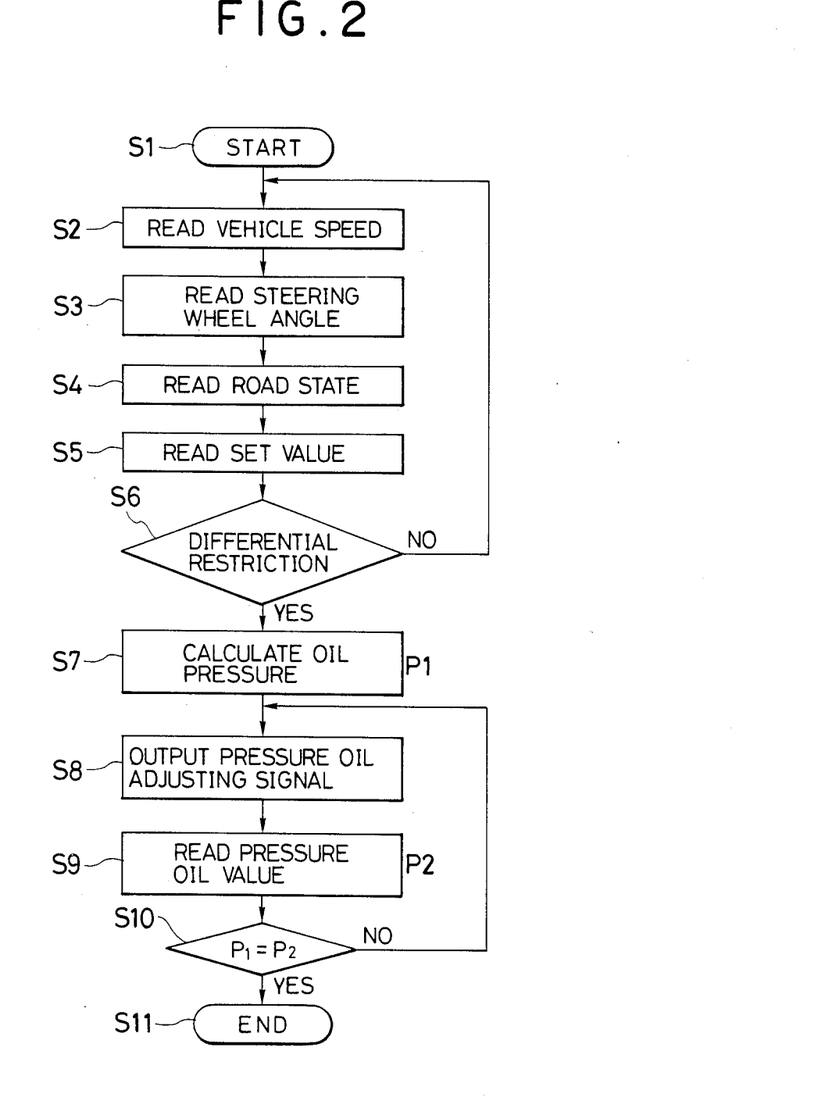
FIG. 2 is a flow chart with respect to a microcomputer used in a controller constituting a main portion of the power transmission apparatus.

In FIGS. 1 and 2, an input shaft 1 and a cylindrical housing are coaxially connected to each other by bolts 6 extending through a flange portion 5 of the shaft and threaded into the housing bottom. A hollow shaft 2 is splined to one end of an output shaft 7 disposed in the central portion of the housing 3 and fitted into the hollow shaft 2. One end of the hollow shaft 2 and the bottom of the housing 3 are sealed with respect to each other by an oil seal 8 and are rotatably arranged with respect to each other through a bearing 9. An annular wall 11 is disposed on the other open end of the housing 3 and is provided with bearings 13a, 13b and seal members 15a and 15b respectively disposed in the outer and inner circumferences of the annular wall 11. The annular wall 11 is axially positioned by stoppers 17a and 17b and a stepped portion 3a disposed on the inner circumferential surface of the housing 3. The annular wall 11 constitutes a stationary member of the apparatus and is disposed between the hollow shaft 2 and the housing 3 rotatable relative to each other in a sealed state.

An annular partition plate 19 is disposed on the left hand side of the annular wall 11 so as to move slightly in the axial direction. Seal members 21a and 21b are disposed in the inner and outer circumferences of the partition plate 19 so as not to prevent the housing 3 and the hollow shaft 2 from being relatively rotated. An annular sealed chamber 23 is defined by the hollow shaft 2, the partition plate 19 and the housing 3. The partition plate 19 can move slightly in the axial direction between the annular wall 11 and a stepped portion 2a disposed on the outer circumferential surface of the hollow shaft 2 on the sealed chamber side.

A plurality of resistance plates 27 are disposed within the sealed chamber 23. Half of the resistance plates 27 are splined to the outer circumference of the hollow shaft 2 in the circumferential direction thereof. The remaining half of the resistance plates 27 are splined to the inner circumference of the housing 3 in the circumferential direction thereof. The distance between the adjacent resistance plates 27 is set to be a predetermined length. The resistance plates 27 thus are alternately splined to the hollow shaft 2 and the housing 3.

The annular wall 11 has an oil passage 29 extending therethrough. A clearance 31 defined between the housing 3, the annular wall 11 and the partition plate 19 is filled with pressurized oil through the oil passage 29. The oil passage 29 is connected to an external system 35 for supplying the pressurized oil to the oil passage through an elbow portion 33 connected to the oil passage 29 and supported by a stationary casing (not shown) of the apparatus. The oil system 35 is provided with an oil tank 37 for storing the pressure oil, an oil pump 39 for pumping the oil from the oil tank 37, a conduit 41 connecting the oil pump 39 to the elbow portion 33, a relief valve 43 disposed in the conduit 41 and a pressure adjusting valve 45 for adjusting the oil pressure in the conduit 41. An actuator 47 comprises the partition plate 19, the clearance 31 and the pressure oil supplying system 35. The pressure of the viscous fluid within the sealed chamber 23 of the viscous coupling 49 is changed through the pressure of the pressure oil within the clearance 31.

A controller 51 for controlling the actuator 47 adjusts the aperture of the pressure adjusting valve 45. In this embodiment, the controller 51 is provided with a microcomputer 53 for automatically controlling the controller. The controller 51 is connected to sensors for detecting running condition, road condition, etc. for a vehicle, for example a vehicle speed sensor 55, a steering wheel sensor 57, and a road sensor for detecting the state of a road by the strength of a reflected wave. The oil pressure is preliminarily adjusted and set and memorized by the actuator 47 on the basis of a result computed by the microcomputer 53 based on the detected values obtained by these sensors.

The pressure of the viscous fluid within the sealed chamber 23 is controlled by the pressure oil supplying system 35 based on the running condition, the road condition, etc. obtained by the respective sensors, thereby adjusting the transmitted torque of the viscous coupling 49, i.e., the extent of the differential restriction.

A pressure sensor 61 is connected to the conduit 41 of the pressure oil supplying system 45 in the vicinity of the annular wall 11 and is connected to the controller 51. The pressure sensor 61 detects the pessure within the clearance 31 as the pressure of the viscous fluid within the sealed chamber 23. In this case, the pressure of the viscous fluid within the sealed chamber 23 cannot be directly detected since the sealed chamber 23 and the output shaft 7 are rotated together with each other. However, the pressure of the viscous fluid within the sealed chamber 23 can be indirectly measured by the oil pressure within the clearance 31 through the movable partition plate 19. The pressure sensor 61 can thus detect the state of the transmitted torque, i.e., the situation of the differential restriction of the viscous coupling. Accordingly, the detected pressure value of the pressure sensor 61 is fed back to the controller 51 and an adjusted value of the oil pressure for the differential restriction instructed to the actuator 47 is confirmed and corrected by the controller 51 if necessary.

The flow chart with respect to the microcomputer 53 included in the controller 51 is shown in FIG. 2.

In this embodiment, the control calculation is performed per a predetermined time, but may per performed by a switching system only in the case of a specific running condition.

When a vehicle starts at step S1, the speed of the vehicle is read by the speed sensor 55 at step S2 and the steering wheel angle is read by the steering wheel angle sensor 57 at step S3. Then, the road condition is read by the road sensor 59 at step S4.

At step S5, the necessity of the differential restriction and the pressure value of the viscous fluid are set in advance on the basis of the respective input conditions, and the memorized pressure of the viscous fluid is read out.

At step S6, the respective input conditions are compared with the set conditions to judge whether the differential restriction is needed or not. When the differential restriction is not needed, the sequence is repeated beginning at S2. When the differential restriction is needed, the sequence is repeated beginning at to S7 where a pressure adjusting value P1 of the pressure oil corresponding to the pressure value of the viscous fluid is calculated. At step S8, a signal for adjusting the oil pressure corresponding to the pressure adjusting value P1 is inputted to the pressure adjusting valve 45. At step S9, a pressure value P2 of the adjusted pressure oil is read from the pressure sensor 61. At step S10, the pressure adjusting value P1 and the pressure value P2 are compared with each other. When the pressure adjusting value P1 is not equal to the pressure value P2, the sequence is repeated beginning at S8. When the pressure adjusting value P1 is equal to the pressure value P2, the oil pressure is suitably adjusted so that the sequence ends at S11.

Accordingly, in the present invention, stable running of the vehicle can be performed by generating the hump phenomenon by controlling the pressure of the pressure oil when the vehicle is running along a rod having a bad condition, at a corner at a high speed, etc.

In the above embodiment, the construction of the controller 51 may be simplified without the automatic control using the microcomputer. For example, two controls for running in a bad road condition such as a dirt road condition and running in a streed road or city road having a good road condition can be switched to each other. In such a case, an operator may manually switch to the first control for bad road condition and instruct the controller so as to strengthen the differential restriction.

Furthermore, instead of operating the actuator 47 using the pressure oil supplying system, the actuator may be operated by a solenoid coil etc. through a thrust bearing and a lever mechanism disposed in the partition plate 19. Instead of disposing the pressure oil supplying system 45, only the pressure within the clearance 31 is detected and the detected pressure at the hump phenomenon may be displayed by a lamp etc. disposed in the driver's seat for example. In this case, the driver can reliablly know the hump phenomenon and perform the exact driving operation in accordance with the hump phenomenon.

As mentioned above, according to the present invention, the hump phenomenon can be reliably and easily controlled. Accordingly, the extent of the differential restriction can be adjusted in an optimum state at any time by an automatic or manual operation in conformity with various running conditions such as the normal running condition, a bad road condition, etc., thereby obtaining a power transmission apparatus for performing stable and safe running.

Furthermore, according to the present invention, the pressure within the sealed chamber can be indirectly detected so that the hump phenomenon can be reliably sensed and controlled, allowing suitable and exact driving operation.

Figure 3:
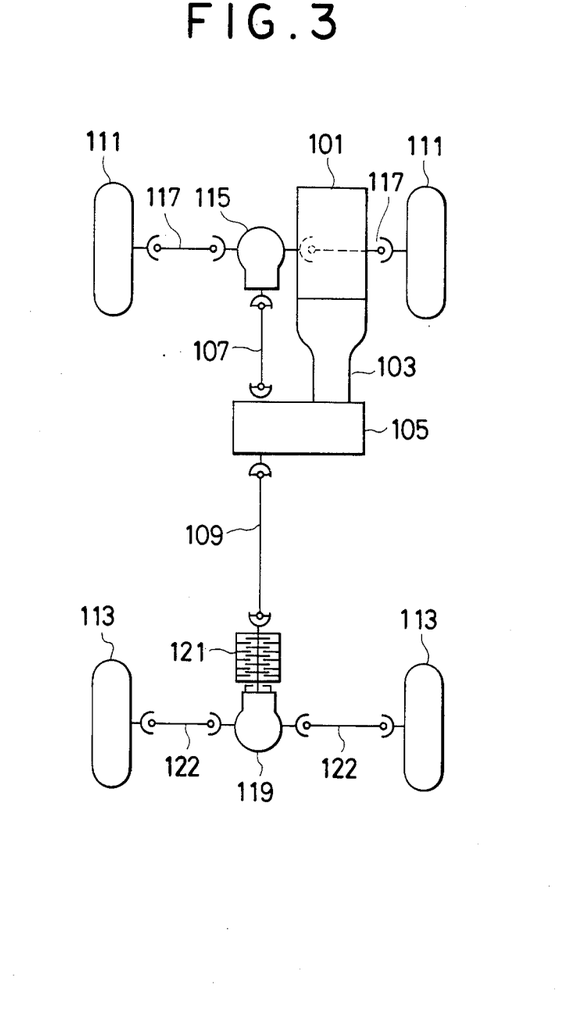
FIG. 3 is a schematic view showing a power transmission apparatus for a vehicle according to another embodiment of the present invention.
Figure 4:
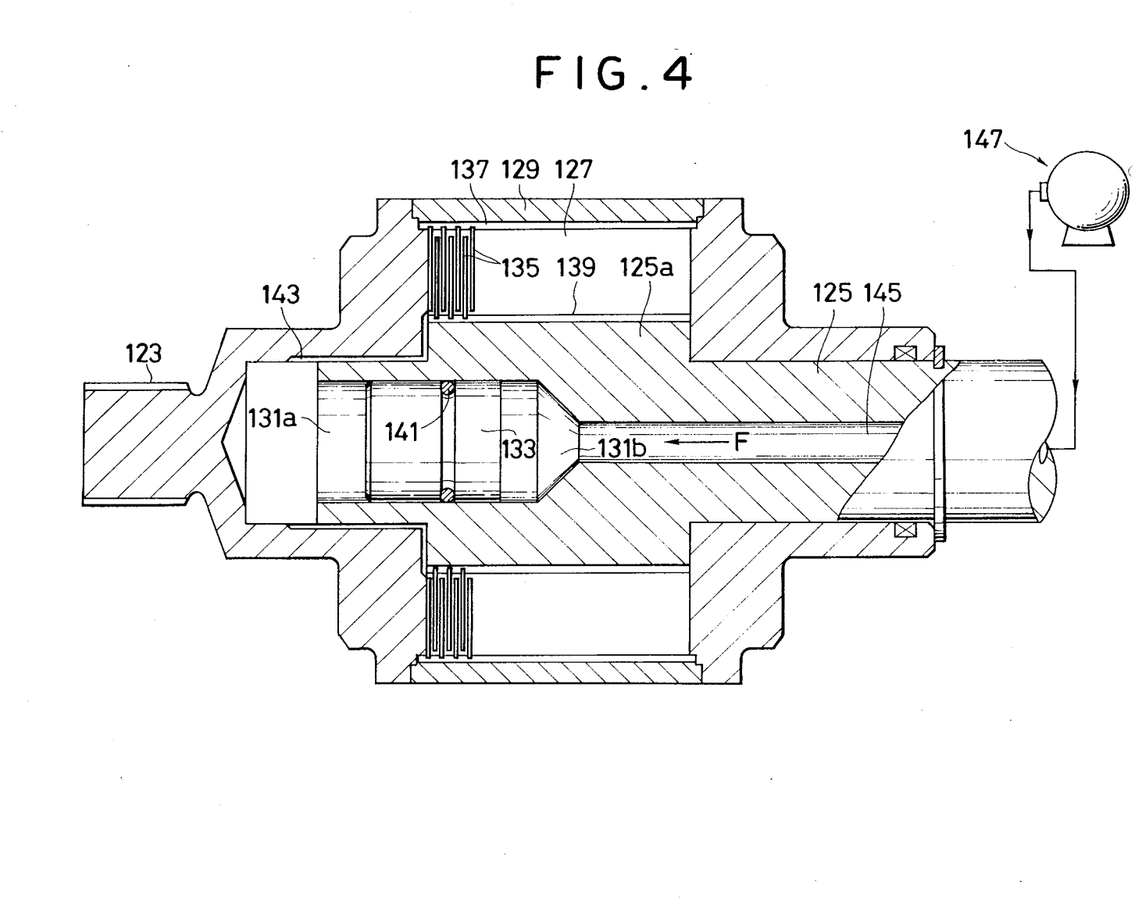
FIG. 4 is a cross-sectional view of a main portion of the power transmission apparatus shown in FIG. 3.

FIGS. 3 and 4 show another embodiment of the present invention. The power of an engine 101 is transmitted to a transfer 105 through a transmission 103. The driving force from the transfer 105 is transmitted to front and rear wheels 111 and 113 through propeller shafts 107 and 109. The front wheels 111 are driven by right and left front shafts 117 through the front propeller shaft 107 and a differential device 115 for the front wheels.

In a system for driving the rear wheels 113, a control coupling 121 as a power transmission apparatus is disposed between a rear propeller shaft 109 and a rear differential device 119. The driving force is transmitted to the rear differential device 119 from the rear propeller shaft 109 through the control coupling 121, and is then transmitted to the rear wheels 113 through right and left rear shafts 122.

The control coupling 121 has first and second rotary members 123 and 125 coaxially disposed with respect to each other, and a sealed chamber 127 formed within a housing 129 connected to the first rotary member 123 into which the second rotary member 125 is fitted. The joining portion of the first rotary member 123 is connected to the propeller shaft 109.

The second rotary member 125 is connected to the back differential device 119, and a piston member 133 is movably disposed within the cylinder chamber 131 in the axial direction. A plurality of resistance plates 135 are disposed to oppose each other within the sealed chamber 127. Half of the resistance plates 135 are engaged with spline grooves 137 formed on the inner circumferential surface of the housing 129. The remaining half of the resistance plates 135 are engaged with spline grooves 139 formed on the outer circumferential surface of the shaft cylindrical portion 125a of the second rotary member 125. A viscous fluid such as silicon oil within the sealed chamber 127 acts on the resistance plates 135.

A front cylinder chamber 131a and a back cylinder chamber 131b with respect to the piston member 133 are reliably sealed by a seal member 141 such as an O ring disposed between the piston member 133 and the second rotary member 125.

The front cylinder chamber 131a is communicated with the sealed chamber 127 through a communicating passage 143. The back cylinder chamber 131b is connected to a through hole 145 for providing an actuating pressure F such as air or oil pressure to the piston member 133 from the back differential device 119 by means of a pressurizing means 147 such as a pump.

In the power transmission apparatus constituted above, the power from the engine 101 is transmitted to the transfer 105. The driving force from the transfer 105 is transmitted to the front wheels 111 and the rear wheels 113 through the control coupling 121.

The rotary force of the first rotary member 123 is transmitted to the second rotary member 125 through the respective resistance plates 135 of the control coupling by the action of the viscous fluid.

When one of the front wheels 111 is bogged down in mud for example, a driver tries to escape using only the rear wheels 113 for example. However, when the transmitted torque of the control coupling is small, the vehicle cannot be freed. In this case, the piston member 133 is pressurized an axially moved by an actuating pressure F from the pressurizing means 147 to change the volume of the cylinder chamber 131a. Accordingly, since the cylinder chamber 131a is communicated with the sealed chamber 127 through the communicating passage 143, the filling rate of the viscous fluid is increased, thereby increasing the transmitted torque. The piston member 133 is disposed within the second rotary member 125 and is not rotated relative to the rotary member 125 so that there is no wear between the piston member 133 and the rotary member 133 and it becomes easy to seal therebetween, thereby obtaining a reliable liquid tight structure.

Figure 5:
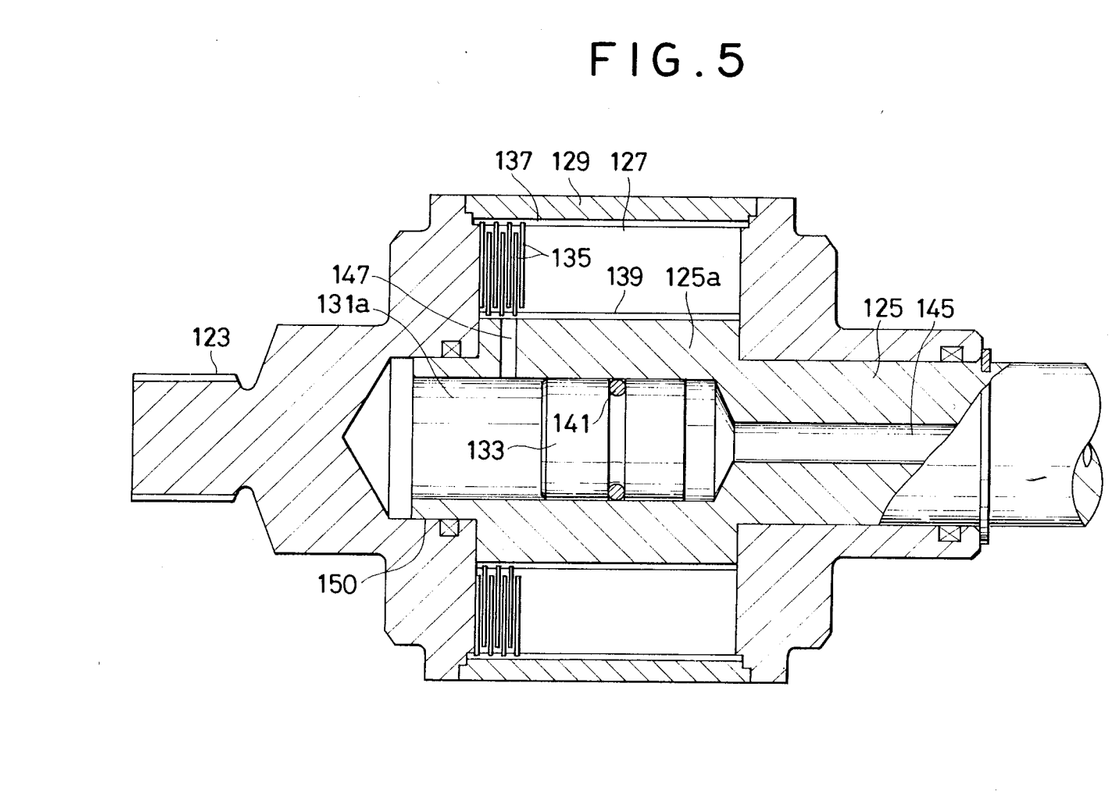
FIGS. 5 and 6 are cross-sectional views each showing a main portion of the power transmission apparatus according to another embodiment of the present invention.
Figure 6:
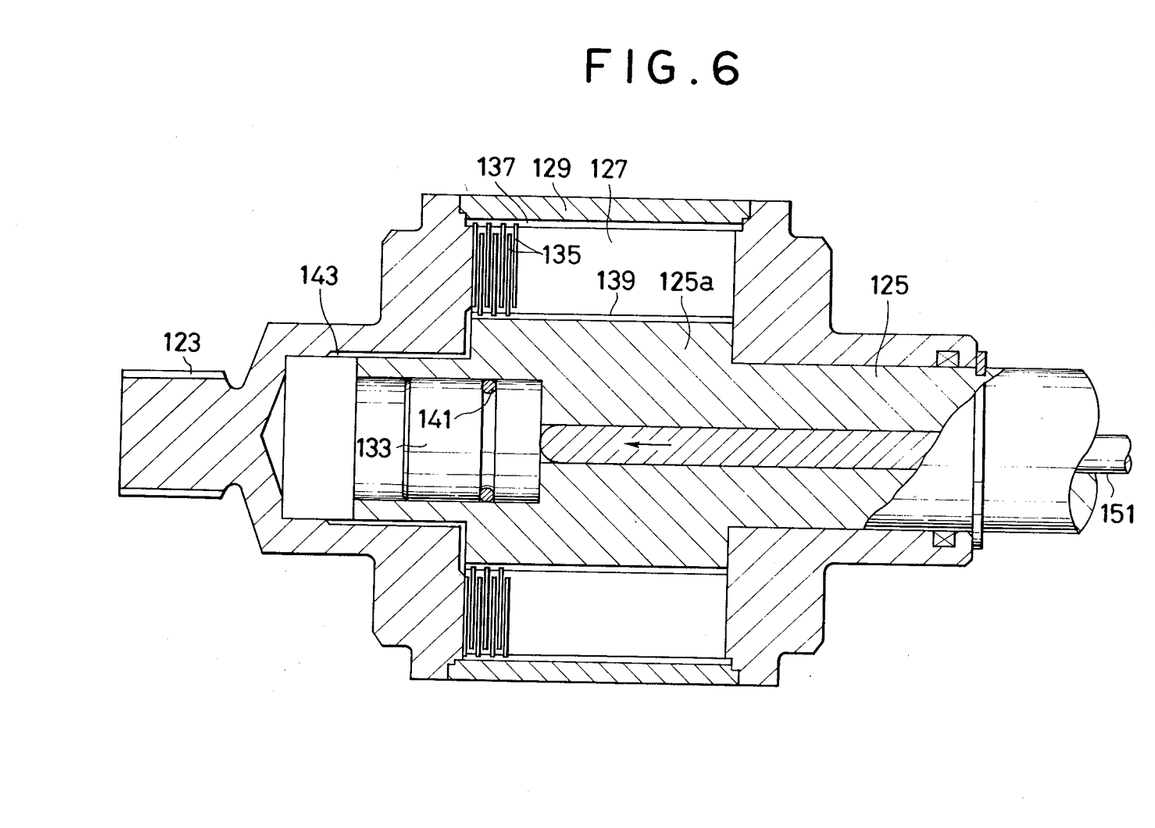

FIG. 5 shows another embodiment of the present invention in which the shape of the communicating passage is changed. Namely, a communicating passage 147 is radially disposed to communicate the sealed chamber 127 with the front cylinder chamber 131a. FIG. 6 shows a further embodiment of the present invention in which the piston member 133 is directly pressed by a rod 151 axially and movably disposed in the second rotary member 125. In these embodiments, effects similar to those in the embodiment shown in FIG. 4 can be obtained.

As mentioned above, in these embodiments, when it is necessary to change the transmitted torque, the volume of the front cylinder chamber is changed by moving the piston chamber, thereby changing the filling rate of the viscous fluid within the sealed chamber. Accordingly, the characteristics of the transmitted torqe suitable for the running condition of a vehicle can be obtained.

Since the piston member is disposed within the rotary member, it is not necessary to dispose a particular seal member between the piston member and the rotary member, obtaining a reliable seal structure therebetween.

What is claimed is:
1. A power transmission apparatus comprising:

first and second rotary means rotatable with respect to each other;
a partition plate means disposed between the second rotary means and a housing of the apparatus and movable in the axial direction of the second rotary means;
a sealed chamber hermetically formed between the second rotary means and the housing, and partially defined by the partition plate means and filled with viscous fluid;
first and second resistance plate means disposed within the sealed chamber and respectively rotatable together with the first and second rotary means to transmit torque therebetween by the shearing resistance of the viscous fluid;
a clearance defined by the partitition plate means and a stationary portion of the apparatus and filled with a second fluid; and
third means for controlling the pressure of the viscous fluid within the sealed chamber through the axial movement of the partition plate means in accordance with a running state of an object provided with the apparatus, said third means supplying the second fluid to the clearance and having a pressure sensor for detecting the pressure of the second fluid in the clearance.

2. A power transmission apparatus as claimed in claim 1, wherein said apparatus further comprises a controller for controlling the operation of the third means.

3. A power transmission apparatus comprising:
first and second rotary means rotatable with respect to each other;
housing means associated with said first and second rotary means for forming a hermetically sealed chamber between said first and second rotary means;
a partition plate contained in said sealed chamber between said first and second rotary means, said partition plate being movable axially with respect to said first and second rotary means and being arranged to subdivide said sealed chamber into first and second chamber portions;
a viscous first fluid contained in said first chamber portion;
first and second resistance plate means disposed within said first chamber portion and being respectively rotatable together with said first and second rotary means to transmit torque therebetween by the shearing resistance of said viscous first fluid;
a second fluid contained in said second chamber portion; and,
third means for controlling the pressure of said viscous first fluid in said first chamber portion by axially adjusting the position of said partition plate in reponse to variations in the pressure of said second fluid in said second chamber portion, said third means including a pressure sensor for detecting the pressure of said second fluid.

4. A power transmission apparatus as claimed in claim 3 wherein said first and second rotary means are operatively connected to drive the wheels of a vehicle, and wherein a control responsive to various driving conditions is employed to control the operation of said third means.

* * * * *